US012371230B2

(12) United States Patent
Nieuwenhuis

(10) Patent No.: US 12,371,230 B2
(45) Date of Patent: Jul. 29, 2025

(54) FILM BAG PROVIDED WITH SUSPENSION OPENINGS, AND METHOD FOR PRODUCING SAID FILM BAG

(71) Applicant: NIVERPLAST HOLDING B.V., Nijverdal (NL)

(72) Inventor: Gerrit Jan Nieuwenhuis, Nijverdal (NL)

(73) Assignee: NIVERPLAST HOLDING B.V., Nijverdal (NL)

( * ) Notice: Subject to any disclaimer, the term of this patent is extended or adjusted under 35 U.S.C. 154(b) by 79 days.

(21) Appl. No.: 18/266,108

(22) PCT Filed: Dec. 9, 2021

(86) PCT No.: PCT/NL2021/050751
§ 371 (c)(1),
(2) Date: Jun. 8, 2023

(87) PCT Pub. No.: WO2022/131906
PCT Pub. Date: Jun. 23, 2022

(65) Prior Publication Data

US 2024/0034515 A1 Feb. 1, 2024

(30) Foreign Application Priority Data

Dec. 15, 2020 (NL) ...................................... 2027113

(51) Int. Cl.
*B65D 33/14* (2006.01)
*B31B 70/14* (2017.01)
(Continued)

(52) U.S. Cl.
CPC .............. *B65D 33/14* (2013.01); *B31B 70/14* (2017.08); *B65D 31/10* (2013.01); *B65D 33/001* (2013.01);
(Continued)

(58) Field of Classification Search
CPC ...... B65D 33/14; B65D 31/10; B65D 33/001; B31B 70/14; B31B 70/984; B31B 2160/20; B31B 70/266; B31B 2155/003
(Continued)

(56) References Cited

U.S. PATENT DOCUMENTS 4,811,417 A 3/1989 Prince
4,981,216 A * 1/1991 Wilfong, Jr. ........... B65D 33/14 493/204

(Continued)

FOREIGN PATENT DOCUMENTS

CA 2061300 A1 10/1992

OTHER PUBLICATIONS

International Search Report for corresponding application PCT/NL2021/050751 filed Dec. 9, 2021; Mail date Mar. 15, 2022.
Written Opinion for corresponding application PCT/NL2021/050751 filed Dec. 9, 2021; Mail date Mar. 15, 2022.

*Primary Examiner* — Jes F Pascua
(74) *Attorney, Agent, or Firm* — CANTOR COLBURN LLP

(57) ABSTRACT

A film bag (1) with a front film layer (2), a rear film layer (3) and side gussets (4, 5), wherein the front film layer (2) and the rear film layer (3) and the two side gussets (4, 5) are connected together at the lower edge; and wherein the film bag (1) is provided with a set of continuous suspension openings (17, 18), each consisting of four perforation openings, so that the film bag (1) is designed to be suspended on a set of carrier pegs (29); wherein the four perforation openings of each continuous suspension opening (17, 18) are provided as slits, and wherein the front slits in the front film layer are longer than those in the rear film layer, and method for producing a film bag (1).

14 Claims, 2 Drawing Sheets

(51) Int. Cl.

| | |
|---|---|
| ***B65D 30/20*** | (2006.01) |
| ***B65D 33/00*** | (2006.01) |
| *B31B 70/26* | (2017.01) |
| *B31B 70/98* | (2017.01) |
| *B31B 155/00* | (2017.01) |
| *B31B 160/20* | (2017.01) |

(52) U.S. Cl.
CPC ........... *B31B 70/266* (2017.08); *B31B 70/984* (2017.08); *B31B 2155/003* (2017.08); *B31B 2160/20* (2017.08)

(58) Field of Classification Search
USPC .............................................................. 383/9
See application file for complete search history.

(56) References Cited

U.S. PATENT DOCUMENTS

| | | | | |
|---|---|---|---|---|
| 5,183,158 | A | 2/1993 | Boyd | |
| 5,484,376 | A | 1/1996 | Prader | |
| 5,669,504 | A | 9/1997 | Leone | |
| 5,690,228 | A * | 11/1997 | DeMatteis ........... | B65D 33/001 206/806 |
| 11,939,113 | B2 * | 3/2024 | Nieuwenhuis ........ | B31B 70/872 |
| 2006/0180492 | A1 * | 8/2006 | Nieuwenhuis ....... | B65D 33/001 206/554 |
| 2009/0274396 | A1 | 11/2009 | Wlkerson | |
| 2019/0030850 | A1 | 1/2019 | Tan | |

OTHER PUBLICATIONS

* cited by examiner

FILM BAG PROVIDED WITH SUSPENSION OPENINGS, AND METHOD FOR PRODUCING SAID FILM BAG

The invention concerns a film bag provided with suspension openings, suitable for use in a bundle on a set of carrier pegs.

The invention also concerns a method for producing a film bag suitable for use in a bundle on a set of carrier pegs, for example for a placing device for opening, spreading and placing a film bag in a container.

NL1012033 in the name of the applicant describes a method and a device for placing a film bag in an outer box or crate. The film bags are usually made of a plastic material such as PP, laminated film, HDPE, MDPE, LDPE, etc., but may also be made of other materials such as for example paper. The film bags are provided with side gussets and have a fully open top side because no weld or seal is provided on the top side. In NL1012033, the film bags are opened by the described device and spread by an automatic opening mechanism, and then arranged in a container such as an outer box or crate. One or more film bags are placed in an outer box or crate, wherein the top edges of the film bag are folded from inside to outside over the side walls of the outer box or crate. The film bags are provided with two continuous suspension openings via which the bundle of film bags can be arranged and suspended on a set of carrier pegs. NL1022290 in the name of the applicant discloses a foil bag (or film bag) for use in the device according to NL1012033, wherein the film bag is provided with two perforation openings, wherein incisions (or slits) are provided at the perforation openings of the front film layer and the front side gusset parts, and wherein no slits are provided in the rear film layer and the rear side gussets parts. This makes the film bag easier to open by hand or by the placing device, because the front perforation openings can easily be moved over the carrier pegs while the rear perforation openings are more difficult to move over the carrier pegs, because the rear perforation openings have roughly the same diameter as the carrier pegs and these perforation openings to some extent stick on the carrier pegs and thus resist movement on the carrier pegs.

One particular embodiment of the film bag is the vest-type carrier bag, or vest bag. The vest bag is a vest-shaped film bag with integrally formed handles, as described and shown in US2011/0164836 and U.S. Pat. No. 4,676,378. Vest bags (T-shirt bags or handle bags or vest-shaped shopping bags) may be formed with or without side gussets or side folds, from tubular film material. The top edge and the bottom edge are sealed, after which a U-shaped part is cut out from the top side of the bag. This forms a vest-shaped bag with two handles. When side gussets are used, the opened handles at the front and rear of the vest bag comprise two film layers. Film bags and vest bags are preferably made from a lightweight, flexible, strong, thermoplastic material. NL1043347 by the applicant describes a T-shirt bag (or vest bag) which is specially designed for use in a positioning (or placing) device for T-shirt/vest bags.

The vest bags are also provided with two continuous suspension openings via which a bundle of vest bags can be arranged and suspended on a set of carrier pegs. These continuous suspension openings are provided in the handles by creating perforation openings, so that the vest bags can slide onto the pegs. For automatic opening and spreading of the vest bag in order to position and place the vest bag in a holder such as a crate or container, a device with an automatic opening mechanism is used, as described by the applicant in NL2023945. Preferably, slits are also provided at the perforation openings of the front film layer and the front side gusset parts, and no slits are provided in the rear film layer and the rear side gusset parts.

In particular, the carrier pegs for the film bags and the vest bags are provided at their end with a bulge or widening (referred to below as a bulge) so that the rear parts of the film bag or the handles of the film bag without slits at the perforation opening will stick on the bulge, and the film bag and vest bag can be opened completely and reliably.

The film bags from NL1022290 and the vest bags from NL1043347 have one significant disadvantage. The suspension openings are provided and made in the film bags by means of punching or stamping with a punch or stamping element. For each perforation opening, a small clipping of film material is punched or stamped out of the film. When side gussets are used in the film bags of NL1022290 and the vest bags of NL1043347, four round clippings from the four film layers are formed for each continuous perforation opening. For two continuous suspension openings, eight round clippings of film are formed for each film bag and each vest bag. These clippings must be removed and must not remain in the film bag, and must not penetrate into foodstuff products which are packed in the film bags, otherwise the film bags will not comply with legal hygiene requirements for packing of foodstuffs.

In the description below, all bags with continuous suspension openings are described as film bags, i.e. including film bags with a handle such as vest bags.

Patent documents U.S. Pat. Nos. 5,484,376 A; 4,811,417; 5,183,158 A; US 2009/274396 A1; U.S. Pat. No. 5,669,504 A; US 2019/030850; CA 2 061 300 A1 disclose film bags which are designed to be suspended on a set of carrier pegs, wherein the four perforation openings of each continuous suspension opening are provided as a slit. This film bags have the disadvantage that they cannot easily be opened by hand or by means of an automatic opening mechanism.

The present invention therefore proposes to provide a film bag which, from a bundle of film bags on carrier pegs, can easily and reliably be opened with high frequency by an opening mechanism of a placing device, wherein the film bags are provided with continuous suspension openings in the film parts so that the film bags can be suspended on carrier pegs, wherein the film bags comply with the requirements for clippings and debris in the Foodstuffs and Commodities Act, wherein the suspension openings are formed by punching or stamping without clippings or debris being formed, and wherein vertical tearing of the suspension openings is prevented.

The invention provides a film bag comprising:

a front film layer and a rear film layer;

a left side gusset and a right side gusset, each comprising a front side gusset part and a rear side gusset part;

wherein the front film layer and the rear film layer and the two side gussets are connected to one another at the bottom edge; and wherein the film bag is provided with a set of continuous suspension openings, each consisting of four perforation openings through the front film layer, the front side gusset part, the rear side gusset part and the rear film layer, so that the film bag is designed to be suspended from a set of carrier pegs;

wherein the four perforation openings of each continuous suspension opening are provided as slits;

wherein the front slits of the front perforation openings in the front film layer are longer than the rear slits of the rear perforation openings in the rear film layer.

By creating the perforation openings as slits, no material is removed from the film layers by punching or stamping, so that no clippings or debris are formed.

By making the front slits of the front perforation openings in the front film layer longer than the rear slits of the rear perforation openings in the rear film layer, the front film layer can easily slide over the carrier pegs while the rear film layer has a greater resistance against movement over the carrier pegs, whereby the film bag can easily be opened by hand or by an automatic opening mechanism.

Preferably, the front slits of the front perforation openings in the two front side gusset parts are longer than the rear slits of the rear perforation openings in the two rear side gusset parts.

By these measures, the front side gusset parts can easily slide over the carrier pegs while the rear gusset parts meet a greater resistance against movement over the carrier pegs, whereby the film bag can be opened more easily and evenly.

In particular, the front slits of the front perforation openings in the front film layer are the same as the front slits of the front perforation openings in the two front side gusset parts.

More particularly, the rear slits of the rear perforation openings in the two rear side gusset parts are the same as the rear slits of the rear perforation openings in the rear film layer.

In this way, the front slits and/or the rear slits can be created more easily and simply at low cost by making the front and/or rear slits in the film bag at the same time.

Preferably, the slits of the perforation openings extend as a straight line. In particular, the slits of the perforation openings extend substantially horizontally. Preferably, the angle between the slits of the perforation openings and the horizontal direction lies in a range from −10 to +10 degrees.

A straight, horizontally extending line as a perforation opening has the advantage that the chance of tearing of one or more perforation openings in the vertical direction by a downwardly directed force on the film bag is reduced, and malfunctioning of the automatic opening mechanism and of any downstream devices such as a positioning device is reduced.

Preferably, the length of the front slits of the perforation openings in the front film layer and in the two front side gusset parts complies with the equation $LV \geq \frac{1}{2} \times OD$, wherein LV=length of front slit and OD=radial circumference of the carrier peg, and the length of the rear slits in the rear perforation openings in the rear film layer and in the two rear side gusset parts complies with the equation $LA \leq \frac{1}{2} \times OD$, wherein LA=length of rear slit and OD=radial circumference of the carrier peg.

With this measure, the front film layer and the front side gusset parts of the film bag can easily slide over carrier pegs with radial circumference OD, while the rear film layer and the rear side gusset parts meet a greater resistance against movement over the carrier pegs with radial circumference OD, whereby the film bag can easily be opened by hand or by an automatic opening mechanism.

If a cylindrical carrier peg with (outer) diameter D is used, the radial circumference OD of the carrier pegs is equal to it $\pi \times D$. For a different shape of cross-section of the carrier peg, the radial circumference OD is determined by measuring with a cord, with an optical measuring method and/or by calculation, or another suitable method. From this radial circumference OD, by calculation, an equivalent circle circumference diameter D' can be calculated using the equation $OD/\pi$.

In a particular embodiment, the length of the front slits of the perforation openings in the front film layer and in the two front side gusset parts complies with the equation $LV \geq \frac{1}{2} \times OB$, wherein LV=length of the front slit and OB=radial circumference of the widest part of the bulge at the end of the carrier peg, and wherein the length of the rear slits of the rear perforation openings in the rear film layer and in the two rear side gusset parts complies with the equation $\frac{1}{2} \times OD \leq LA \leq \frac{1}{2} \times OB$, wherein LA=length of the rear slit, OD=radial circumference of the carrier peg and OB=radial circumference of the widest part of the bulge at the end of the carrier peg.

By these measures, the front film layer and the front side gusset parts of the film bag can easily slide over the bulge at the end of the carrier pegs, while the rear film layer and the rear side gusset parts meet a greater resistance against movement over the bulge at the end of the carrier pegs, but meet little resistance from the carrier pegs, whereby the film can easily be opened by hand or by an automatic opening mechanism.

If the shape of the bulge at the greatest radial circumference OB in cross-section defines a circle, the (outer) diameter E of this circle is equal to $OB/\pi$. For a different shape of cross-section of the bulge at the greatest radial circumference, an equivalent circle circumference diameter E' can be calculated using the equation $OB/\pi$.

In particular, the length of the rear slit complies with the equation $LA=\pi/2 \times D \pm 10\%$ and the length of the front slit complies with the equation $LV=OB/2 \times F\{1|2\}$ wherein $F\{1|2\}$ is defined as $1 \leq F \leq 2$, D=the (outer) diameter of the carrier peg, and OB=the radial circumference of the widest part of the bulge next to the end of the carrier peg.

If the length of the rear slit is approximately equal to or greater than half the circumference of the carrier pegs, and if the length of the front slit is approximately equal to or greater than half the radial circumference of the widest part of the bulge×F, wherein F is selected from the range between 1 and 2, and wherein the front slit is longer than the rear slit, then a film bag is obtained which can be reliably opened from the carrier pegs.

In a preferred embodiment, a spot connection is provided between the front film layer and the left and right front side gusset parts, whereby the film bag can be opened more reliably on the carrier pegs because the front film parts can together easily slide over the carrier pegs (provided with a bulge), and the film bag can be opened properly.

The invention also concerns a method for producing a film bag for use in a bundle on a set of carrier pegs, comprising the steps:

- forming a film bag with side gussets from a tubular flexible film;
- introducing punch plates into the two side gussets from the outside;
- creating perforation openings as front slits in the front film layer and in the two front side gusset parts, and
- creating perforation openings as rear slits in the rear film layer and in the two rear side gusset parts.

By using punch plates in both side gussets, the continuous suspension openings can be produced as front slits in the front film layer and in the front side gusset parts, and as rear slits in the rear film layer and in the two rear side gusset parts, whereby no film clippings or debris are formed, while the front slits and the rear slits may be provided with mutually differing shape and/or length in order to improve the opening of the film bag.

In particular, the perforation openings are created as horizontally extending straight slits.

With these measures, the reliability of opening the film bag is increased because the chance of tearing of the continuous openings is reduced.

Preferably, the front slits of the front perforation openings in the front film layer and in the two front side gusset parts are longer than the rear slits of the rear perforation openings in the rear film layer and in the two rear side gusset parts.

In this way, the front film parts can be moved more easily than the rear film parts over the carrier pegs and over the optional bulge next to the end of the carrier pegs, and the film bag can be reliably opened by an automatic opening mechanism.

In particular, the method comprises the step of creating a spot connection between the front film layer and a front side gusset part. By this measure, the front film layer and the front side gusset parts are together pushed over the carrier pegs so that the film bag can be reliably opened.

FIRST EXEMPLARY EMBODIMENT

Figure 1:
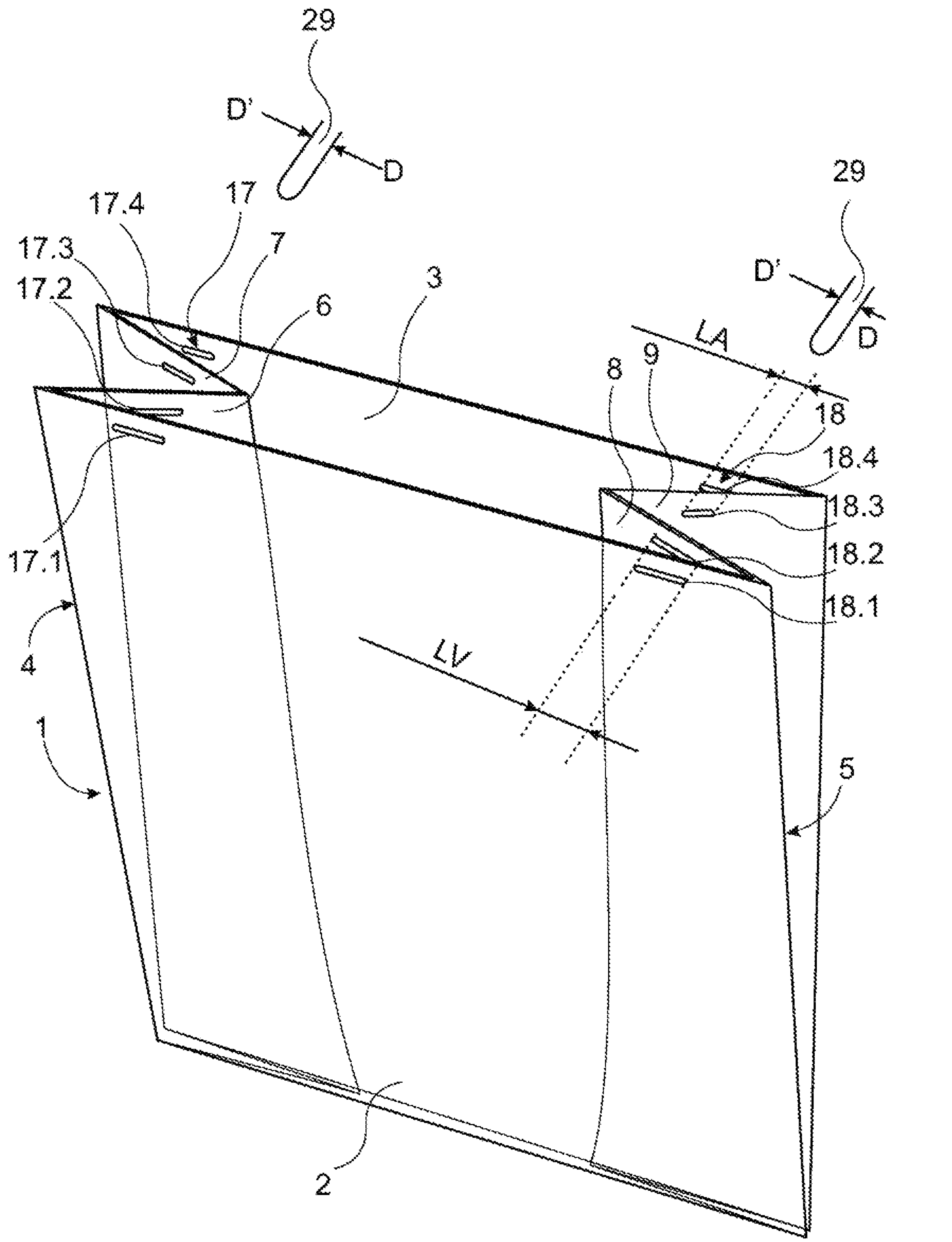
FIG. 1 shows a film bag according to the invention.

FIG. 1 shows a film bag 1 which can be suspended, in a bundle of film bags, by means of a set of (here two) carrier pegs 29. The film bag 1 comprises a front film layer 2, a rear film layer 3, a left side gusset 4 and a right side gusset 5, each with a respective front side gusset part 6, 8 and rear side gusset part 7, 9. Such film bags are made from a tubular film, from which individual film bags are produced by the creation of welds at the bottom edge (and optionally at the top edge for film bags of the vest bag type, see FIG. 2). If side gussets are used, these are connected to the front and rear film layers at the bottom edge. Because the film bag is made from one piece of tubular film, the different film layers of the film bag are substantially the same with respect to composition and physical properties, including film thickness.

The film bag 1 is provided with a set of (here two) continuous suspension openings 17, 18, consisting of four perforation openings 17.1, 17.2, 17.3, 17.4 in the left part of the film bag and four perforation openings 18.1, 18.2, 18.3, 18.4 in the right part of the film bag, respectively in the front film layer 2, the front gusset parts 6, 8, the rear side gusset parts 7, 9, and the rear film layer 3. Thus the film bag 1 is arranged and suitable for being suspended on a set of carrier pegs 29 for manual or automatic opening of the film bag.

The perforation openings 17.1, 17.2, 17.3, 17.4, 18.1, 18.2, 18.3, 18.4 are provided as slits so that no material is removed during creation of the continuous suspension openings 17, 18, whereby no debris or clippings of the film material are formed. The perforation openings 17.1, 17.2, 17.3, 17.4, 18.1, 18.2, 18.3, 18.4 in FIG. 1 are straight slits, but may also have a different shape. The slits of the perforation openings 17.1, 17.2, 17.3, 17.4, 18.1, 18.2, 18.3, 18.4 in FIG. 1 extend horizontally, which reduces the chance of tearing in the vertical direction on the carrier pegs. It has been found that with an angle between −10 and +10 degrees between the slit and the horizontal direction, tearing and the formation of clippings and/or debris are considerably limited; and faults in, and malfunctioning of the automatic opening mechanism and any downstream devices such as a positioning device are significantly reduced.

In FIG. 1, the perforation openings 17.1, 17.2, 17.3, 17.4, 18.1, 18.2, 18.3, 18.4 are provided as straight slits, wherein the perforation openings 17.1, 18.1 in the front film layer 2 are provided as slits which are longer than the slits of the perforation openings 17.4, 18.4 in the rear film layer. As a result, the front film layer 2 can more easily slide over the carrier pegs 29, while it is more difficult to slide the rear film layer 3 over the carrier pegs 29, whereby the film bag 1 can easily be opened by hand or by an automatic opening mechanism.

In this basic embodiment, the length of the perforation openings 17.2 17.3 18.2, 18.3 in the front side gusset parts 6, 8 and in the rear side gusset parts 7, 9 is selected freely, but a length of the slit which is smaller than the length of the rear perforation openings 17.4, 18.4 in the rear film layer would be greatly disadvantageous because of the effect of inhibiting the moving of the front side gusset parts 6, 8 and rear side gusset parts 7, 9 over the carrier pegs 29, which increases the chance of an irregular opening of the film bag 9.

In a preferred embodiment, which can be produced easily and simply, the front slits of the front perforation openings 17.2, 18.2 in the two front side gusset parts 6, 8 are longer than the rear slits of the rear perforation openings 17.3, 18.3 in the two rear side gusset parts 7, 9.

In another preferred embodiment of FIG. 1, which can be produced easily and simply, the front slits of the front perforation openings 17.1, 18.1 in the front film layer 2 are the same as the front slits of the front perforation openings 17.2, 18.2 in the two front side gusset parts 6, 8.

Also, the rear slits of the rear perforation openings 17.3, 18.3 in the two rear side gusset parts 7, 9 are the same as the rear slits of the rear perforation openings 17.4, 18.4 in the rear film layer 3.

As a result, the front parts of the film bag can slide more easily over the carrier pegs, and the film bag can be opened more easily and regularly.

It has been found that by determining the length LV of the front slits of the perforation openings 17.1, 17.2, 18.1, 18.2 in the front film layer 2 and in the front side gusset parts 6, 8 using the equation $LV \geq \frac{1}{2} \times OD$ wherein OD=the radial circumference of the carrier peg, and by determining the length LA of the rear slits of the perforation openings 17.3, 17.4, 18.3, 18.4 in the rear film layer 3 and in the rear side gusset parts 7, 9 using the equation $LA \leq \frac{1}{2} \times OD$, the front film layer 2 and the front side gusset parts 6, 8 of the film bag 1 can easily slide over carrier pegs 29 with diameter D, while the rear film layer 3 and the rear side gusset parts 7, 9 meet a greater resistance against movement over the carrier pegs 29 with diameter D, whereby the film bag 1 can easily be opened by hand or by an automatic opening mechanism.

This embodiment is advantageous in a film bag without handles, because the film bag can easily be opened automatically so that the spreading device of the placing/positioning device can be introduced into the film bag.

For a cylindrical carrier peg with an (outer) diameter D, the radial circumference OD of the carrier peg is equal to it $\pi \times D$. For a different shape of cross-section of the carrier peg, the radial circumference OD can be determined by measuring with a cord, an optical measuring method and/or by calculation or another suitable method. From this radial circumference OD, by calculation, an equivalent circle circumference diameter D' is calculated using the equation $OD/\pi$.

SECOND EXEMPLARY EMBODIMENT

Figure 2:
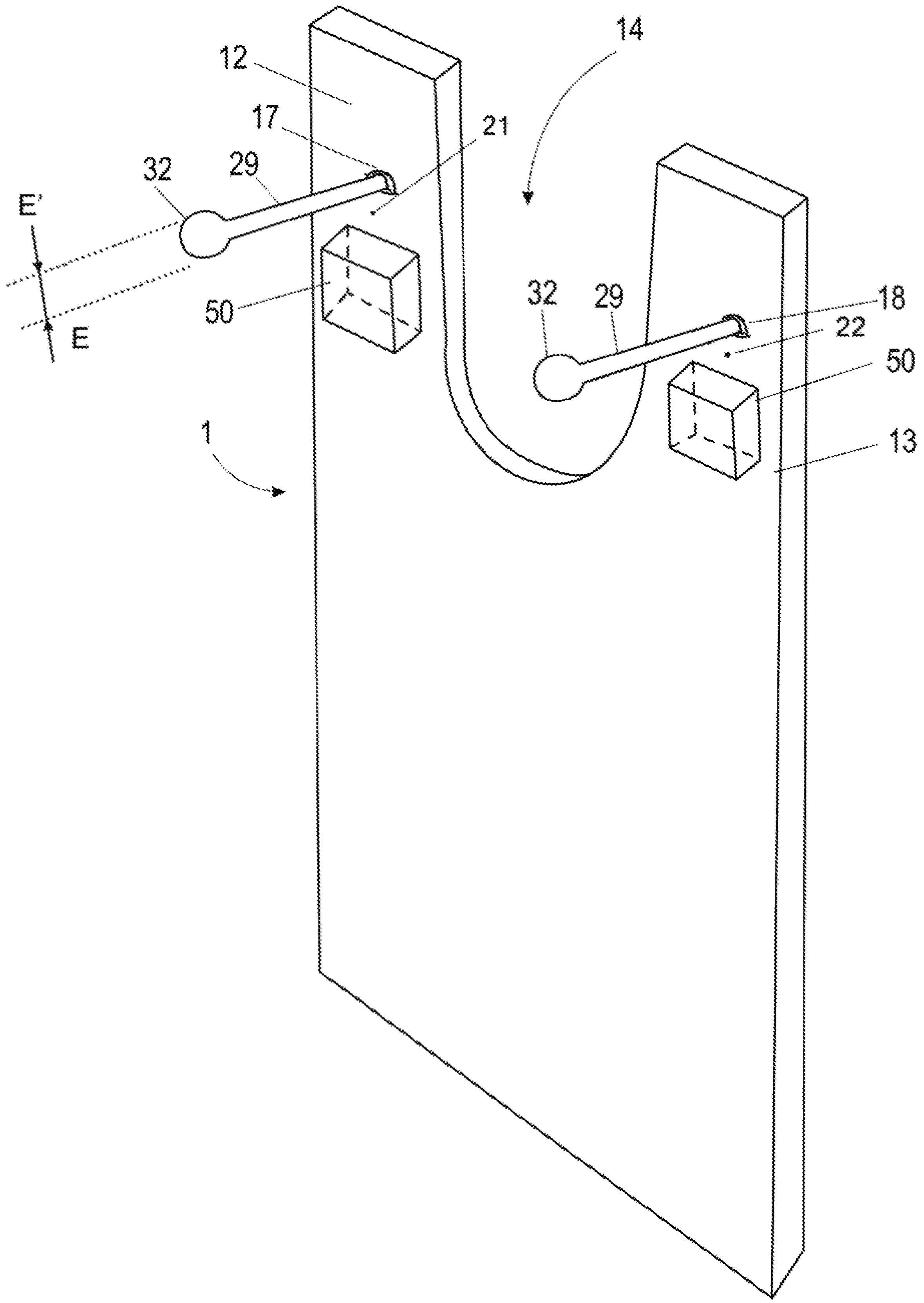
FIG. 2 shows a film bag of the vest bag type according to the invention.

FIG. 2 shows a bundle of film bags of the vest bag type, which is suspended by means of carrier pegs 29. At one end, the carrier pegs 29 are provided with a bulge 32. Similarly to the film bag in FIG. 1, the vest-type film bag is provided with a front film layer, a rear film layer, a left side gusset and a right side gusset, each with a front side gusset part and rear side gusset part. Such vest bags are made as film bags from a tubular film, from which individual film bags can be produced by creation of bottom and top welds at the bottom edge and top edge. If side gussets are used, these are also connected to the front and rear film layers at the bottom edge and top edge. Because the vest bag is made from one piece of tubular film, the different film layers of the vest bag are substantially the same with respect to the composition and physical properties, including the film thickness.

At the top of the film bag 1 of the vest bag type, two handles 12, 13 are formed by making a cutout 14 in the film bag, which cutout extends from the top edge into both side gussets so as to form a left and right carrier opening. The two handles 12, 13 are provided with a continuous suspension opening 17, 18, consisting of four perforation openings in the left handle 12 and four perforation openings in the right handle 13, respectively for the front film layer, the front side gusset parts, the rear side gusset parts and the rear film layer. Thus the film bag 1 of the vest bag type is arranged and suitable for being suspended from a set of carrier pegs 29, wherein optionally the carrier pegs are provided with a bulge 32 at their end.

FIG. 2 shows two vacuum cups or vacuum elements 50 of the opening mechanism of an automatic opening and/or placing device. These vacuum elements 50 grip the front film layer 2 of the left handle 12 and right handle 13 below the continuous suspension openings 17, 18. In the easy-open system of the applicant, the front film layer 2 of the vest-type film bag is suspended on the vacuum elements 50, and the rear film layer 3 remains on (the bulge 32 of) the easy-open carrier pegs 29.

In FIG. 2 (similarly to the exemplary embodiment in FIG. 1), the perforation openings of the continuous suspension openings 17, 18 are configured as straight slits, wherein similarly to the film bag 1 from FIG. 1, the perforation openings 17.1, 18.1 in the front film layer 2 are provided with a front slit which is longer than the rear slit of the perforation openings 17.4, 18.4 in the rear film layer 3.

Because of the longer front slits, the front film layer 2 of the handles 12, 13 can slide more easily over the carrier pegs 29, and over the bulge 32 next to the end of the carrier pegs 29, than the rear film layer 3 with shorter rear slits.

Similarly to the described exemplary embodiments of FIG. 1, the front slits of the front perforation openings 17.2, 18.2 in the two front side gusset parts 6, 8 may be longer than the rear slits of the rear perforation openings 17.3, 18.3 in the two rear side gusset parts 7, 9.

Additionally or alternatively, the front slits of the front perforation openings 17.1, 18.1 in the front film layer 2 are the same as the front slits of the front perforation openings 17.2, 18.2 in the two front side gusset parts 6, 8.

Additionally or alternatively, the rear slits of the rear perforation openings 17.3, 18.3 in the two rear side gusset parts 7, 9 are the same as the rear slits of the rear perforation openings 17.4, 18.4 in the rear film layer 3.

Preferably, the length LV of the front slits of the perforation openings 17.1, 17.2, 18.1, 18.2 in the front film layer 2 and in the front side gusset parts 6, 8 complies with the equation: $LV \geq \frac{1}{2} \times OB$, wherein OB=the radial circumference of the widest part of the bulge next to the end of the carrier peg, and the length LA of the slits of the perforation openings 17.3, 17.4, 18.3, 18.4 in the rear film layer 3 and in the rear side gusset parts 7, 9 complies with the equation $\frac{1}{2} \times OD \leq LA \leq \frac{1}{2} \times OB$.

By these measures, the front film layer 2 and the front side gusset parts 6, 8 of the vest bag 1 can easily slide over the bulge 32 at the end of the carrier pegs 29, while the rear film layer 3 and the rear side gusset parts 7, 9 meet a greater resistance against movement over the bulge 32 at the end of the carrier pegs 29, but little resistance from the carrier pegs, whereby the vest bag 1 can easily be opened by hand or by an automatic opening mechanism.

If the form of the bulge at the greatest radial circumference OB in cross-section defines a circle, the (outer) diameter E of this circle is equal to $OB/\pi$. For a different shape of cross-section of the bulge at the greatest radial circumference, an equivalent circle circumference diameter E' can be calculated using the equation $B/\pi$.

For a film bag 1 of the vest bag type with two handles 12, 13, it is disadvantageous that the continuous suspension openings 17, 18 are made in the narrow parts of the film bag, i.e. the two handles 12, 13. Therefore the movement of the front side gusset parts over the carrier pegs 29 and over the bulge 32 at the end of the carrier pegs is not controlled and is arbitrary. The front side gusset parts may remain stuck on the bulge 32 at the end of the carrier pegs 29 and thereby close the carrier opening fully or partly again, so that gripper hooks of an opening mechanism of the placing device cannot be correctly introduced sideways into the carrier openings of the handles, and the opening mechanism cannot reliably open and tension the handles of the film bag.

FIG. 2 shows that a spot connection 21, 22 is provided in each handle 12, 13 between the front film layer and the front side gusset parts. It has been found that by creating spot connections 21, 22 in the handles, the sideways introduction of the gripper hooks of the opening mechanism of the placing device into the carrier openings of the film bag of the vest bag type can be carried out with great reliability and high frequency.

The spot connection 21, 22 may be created as a glue connection, a weld connection or a punched connection; for example, at the same time as creating the perforation openings.

If the spot connections 21, 22 are provided next to the continuous suspension openings 17, 18 in the handles 12, 13, the front film layer and the front side gusset parts move together, with equal resistance, over the bulges 32 of the carrier pegs 29 without the film layers moving relative to one another.

The use of a bulge 32 on the carrier pegs 29 and the provision of spot connections 21, 22 are not necessarily reserved for and/or exclusive to vest-type film bags; these may also be provided for the film bags from FIG. 1 without handles.

If the film bag 1 from the exemplary embodiment of FIG. 1 is suspended in a bundle on cylindrical carrier pegs 29 with diameter D and with bulge 32 with greatest circumference OB of FIG. 2, good results are obtained in an opening mechanism of a placing device if the length LA of the rear slits complies with the equation $LA = \pi/2 \times D \pm 10\%$ and the length LV of the front slits complies with the equation $LV = OB/2 \times F\{1|2\}$, wherein $F\{1|2\}$ is defined as $1 \leq F \leq 2$ with a value between 1 and 2, D=the (outer) diameter of the carrier peg 29, and OB=the radial circumference of the widest part of the bulge 32 next to the end of the carrier peg 29.

For example, with a greatest circumference OB of the bulge 32 of 45 mm and a diameter D of 10 mm for the carrier peg 29, the length of the rear slit is selected as LA=15 mm±10% and the length $LV = 45/2 \times F\{1|2\}$ of the front slit is selected with a value between 22.5 and 45 mm.

The film bag for use in a bundle on a set of carrier pegs may be produced in the following inventive fashion.

Firstly, a film bag is formed with side gussets 4, 5 from a tubular flexible film. Then punch plates are introduced into the two side gussets 4, 5 from the outside, so that continuous suspension openings are formed by perforation openings in the front side gusset and in the front film layer which are different from the perforation openings in the rear side gusset and the rear film layer. Then the piece of tubular film is provided with a closed lower edge by means of sealing (welding), and for a film bag of the vest type, is also provided with a closed top edge.

The perforation openings 17.1, 17.2; 18.1, 18.2 (see FIG. 1) in the front film layer 2 and in the two front side gusset parts 6, 8 are produced as slits. The perforation openings 17.3, 17.4; 18.3, 18.4 (see FIG. 1) in the rear film layer 3 and in the two rear side gusset parts 7, 9 are also produced as slits. Preferably, the front slits of the perforation openings 17.1, 17.2; 18.1, 18.2 in the front film layer 2 and in the two front side gusset parts 6, 8 are longer than the rear perforation openings 17.3, 17.4; 18.3, 18.4 in the rear film layer 3 and in the two rear side gusset parts 7, 9. With these measures, no clippings or debris can be formed and/or remain in the formed film bag, while the film bag in a bundle on carrier pegs can be opened well by hand or by an automatic opening machine.

Then, or at the same time, optionally spot connections 21, 22 may be made between the front film layer 2 and the two front side gusset parts 6, 8. Preferably, the spot connections 21, 22 are arranged below the front perforation openings 17.1, 17.2; 18.1, 18.2, so that the front parts of the film bag can easily slide over the (bulge of the) carrier pegs, and the front parts of the film bag can easily be separated from the rear parts of the film bag.

Preferably, the perforation openings are produced as horizontally extending slits, whereby the chance of tearing of the perforation openings in the vertical direction on the carrier pegs is reduced, and faults in the automatic opening mechanism and any downstream devices, such as a positioning device, are significantly reduced.

By creating the continuous suspension openings as (horizontal) slits, a film bag is obtained which can easily and reliably be opened, spread and placed in a container such as a crate by a placing device for film bags, wherein the chance of forming clippings and/or debris is significantly reduced.

The invention claimed is:

1. A film bag comprising:

a front film layer;

a rear film layer;

a left side gusset and a right side gusset, each comprising a front side gusset part and a rear side gusset part;

wherein the front film layer and the rear film layer and the two side gussets are connected to one another at a bottom edge; and wherein the film bag is provided with a set of continuous suspension openings, each comprising four perforation openings through the front film layer, the front side gusset part, the rear side gusset part and the rear film layer, so that the film bag is designed to be suspended from a set of carrier pegs;

wherein the four perforation openings of each continuous suspension opening are provided as slits, wherein the front slits of the front perforation openings in the front film layer are longer than the rear slits of the rear perforation openings in the rear film layer;

wherein a length of the front slits of the perforation openings in the front film layer and in the two front side gusset parts complies with the equation:

$$LV \geq \frac{1}{2} \times OD$$

wherein LV=length of front slit, and OD=radial circumference of the carrier peg; and wherein a length of the rear slits in the rear perforation openings in the rear film layer and in the two rear side gusset parts complies with the formula:

$$LA \leq \frac{1}{2} \times OD$$

wherein LA=length of rear slit, and OD=radial circumference of the carrier peg.

2. The film bag as claimed in claim 1, wherein the front slits of the front perforation openings in the two front side gusset parts are longer than the rear slits of the rear perforation openings in the two rear side gusset parts.

3. The film bag as claimed in claim 1, wherein the front slits of the front perforation openings in the front film layer are the same as the front slits of the front perforation openings in the two front side gusset parts.

4. The film bag as claimed in claim 1, wherein the rear slits of the rear perforation openings in the two rear side gusset parts are the same as the rear slits of the rear perforation openings in the rear film layer.

5. The film bag as claimed in claim 1, wherein the slits of the perforation openings extend as a straight line.

6. The film bag as claimed in claim 1, wherein the slits of the perforation openings extend substantially horizontally.

7. The film bag as claimed in claim 1, wherein an angle between the slits of the perforation openings and a horizontal direction lies in a range from −10 to +10 degrees.

8. The film bag as claimed in claim 1, wherein a spot connection is provided between the front film layer and the front side gusset part.

9. A method for producing a film bag as claimed in claim 1 for use in a bundle on a set of carrier pegs, comprising the steps:

forming a film bag with side gussets from a tubular flexible film;

introducing punch plates into the two side gussets from the outside;

creating perforation openings as front slits in the front film layer and in the two front side gusset parts; and creating perforation openings as rear slits in the rear film layer and in the two rear side gusset parts.

10. The method as claimed in claim 9, wherein the perforation openings are created as horizontally extending straight slits.

11. The method as claimed in claim 9, wherein the front slits of the front perforation openings in the front film layer and in the two front side gusset parts are longer than the rear slits of the rear perforation openings in the rear film layer and in the two rear side gusset parts.

12. The method as claimed in claim 9, furthermore comprising the step of creating a spot connection between the front film layer and the two front side gusset parts.

13. A film bag comprising:

a front film layer;

a rear film layer;

a left side gusset and a right side gusset, each comprising a front side gusset part and a rear side gusset part;

wherein the front film layer and the rear film layer and the two side gussets are connected to one another at a bottom edge; and wherein the film bag is provided with a set of continuous suspension openings, each comprising four perforation openings through the front film layer, the front side gusset part, the rear side gusset part and the rear film layer, so that the film bag is designed to be suspended from a set of carrier pegs;

wherein the four perforation openings of each continuous suspension opening are provided as slits, wherein the front slits of the front perforation openings in the front film layer are longer than the rear slits of the rear perforation openings in the rear film layer;

wherein the length of the front slits of the perforation openings in the front film layer and in the two front side gusset parts complies with the formula:

$$LV \geq \tfrac{1}{2} \times OB$$

wherein LV=length of the front slit and OB=radial circumference of the widest part of the bulge next to the end of the carrier peg, and wherein the length of the rear slits of the rear perforation openings in the rear film layer and in the two rear side gusset parts complies with the formula:

$$\tfrac{1}{2} \times OD \leq LA \leq \tfrac{1}{2} \times OB$$

wherein LA=length of the rear slit, OD=radial circumference of the carrier peg and OB=radial circumference of the widest part of the bulge next to the end of the carrier peg.

14. A film bag comprising:

a front film layer;

a rear film layer;

a left side gusset and a right side gusset, each comprising a front side gusset part and a rear side gusset part;

wherein the front film layer and the rear film layer and the two side gussets are connected to one another at a bottom edge; and wherein the film bag is provided with a set of continuous suspension openings, each comprising four perforation openings through the front film layer, the front side gusset part, the rear side gusset part and the rear film layer, so that the film bag is designed to be suspended from a set of carrier pegs;

wherein the four perforation openings of each continuous suspension opening are provided as slits, wherein the front slits of the front perforation openings in the front film layer are longer than the rear slits of the rear perforation openings in the rear film layer;

wherein the length of the rear slit complies with the equation $LA=\pi/2 \times D \pm 10\%$;

wherein the length of the front slit complies with the equation $LV=OB/2 \times F\ \{1|2\}$; and wherein $F\ \{1|2\}$ is defined as $1 \leq F \leq 2$, D=the (outer) diameter of the carrier peg, and OB=the radial circumference of the widest part of the bulge next to the end of the carrier peg.

* * * * *